June 20, 1967 — H. DEURING — 3,326,562
VALVE-SHAFT SEAL FOR INTERNAL COMBUSTION ENGINES
Filed Jan. 8, 1964

Inventor
Hans DEURING

By *Melvin R. Crosby*
Attorney

United States Patent Office 3,326,562
Patented June 20, 1967

3,326,562
VALVE-SHAFT SEAL FOR INTERNAL
COMBUSTION ENGINES
Hans Deuring, Burscheid, near Cologne, Germany, assignor to Goetzewerke Friedrich Goetze Aktiengesellschaft, Cologne, Germany, a corporation of Germany
Filed Jan. 8, 1964, Ser. No. 336,536
Claims priority, application Germany, Jan. 18, 1963,
G 36,851; Aug. 13, 1963, G 38,453
3 Claims. (Cl. 277—182)

The invention disclosed herein relates to a valve-shaft seal for internal combustion engines and is particularly concerned with a device for securing a tubular resilient rubber member in engagement with a sealing ring which is disposed in sealing engagement with the valve shaft.

The fastening of the sealing ring which embraces the valve shaft and which is by means of a rubber member secured against displacement from its assigned position and sealed thereby, often entails considerable difficulties owing to the very tight space which is available between the valve shaft and the valve spring.

A known device for sealing valves of internal combustion engines comprises a ring-like sealing member which is drawn over the outer end of the valve shaft, and a rubber member for securing such sealing member against being carried along by the action of the valve shaft, said securing member being also operative to seal the ring-like sealing member peripherally with respect to the means for guiding the valve shaft. In such structures, the securing member is held on the valve-guide means by being vulcanized thereto or by bulges formed thereon or by split rings or the like. This manner of fastening the securing member is not wholly satisfactory owing to the necessity of providing separate fastening means or of applying separate assembly or positioning operations.

The present invention is based upon recognition of the fact that the inherent tension of the material of the soft rubber securing member suffices for holding it in assigned position provided that the tubular shank or fastening portion thereof is reinforced by means made of hard material such as metal or the like.

According to the invention, the hard material reinforcing body may be in the form of a sleeve which is at least partially embedded in the fastening or shank portion of the securing member.

It may be mentioned at this point that it is known to use, in connection with shaft seals, bushings made of soft rubber and to reinforce such bushings by means of metal rings embedded therein or embracing them. However, the conditions encountered in connection with devices for sealing shafts, for example, rotating shafts, are entirely different, spatially and structurally, from those that have to be coped with in connection with the sealing of valves.

Figure 1:
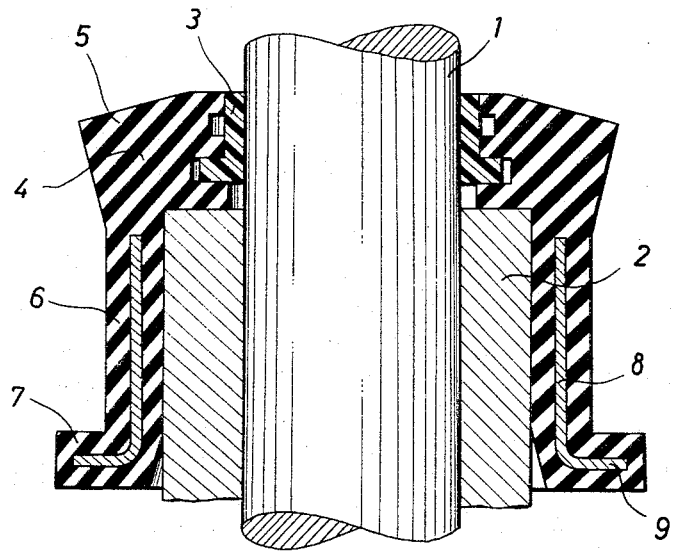
Figure 2:
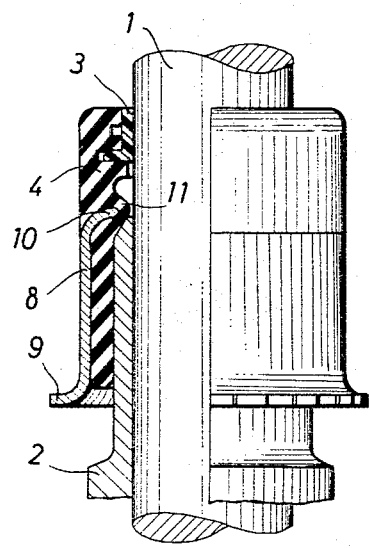
Figure 3:
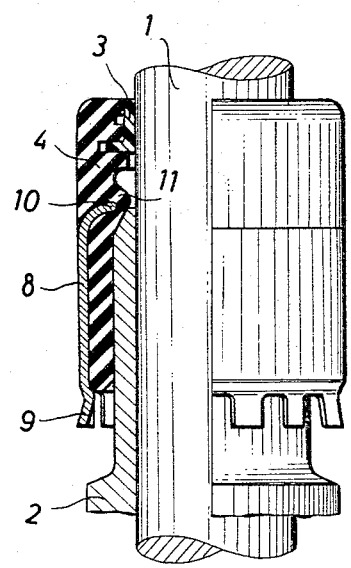

The various objects and features of the invention will appear from the appended claims and from the description of embodiments thereof which is rendered below with reference to the accompanying drawing, wherein FIG. 1 shows an embodiment comprising a reinforcing sleeve embedded in the tubular shank of the securing member for sealing engagement with the sealing ring surrounding a valve shaft;

FIG. 2 illustrates an embodiment having a reinforcing sleeve surrounding the tubular shank of a securing member with the mounting flange in initial position; and FIG. 3 represents the structure of FIG. 2 with the mounting flange in final position.

Referring now to FIG. 1, numeral 1 indicates the valve shaft which is surrounded by a guide bushing 2 and sealed by means of a ring 3 made of synthetic resin or the like. The sealing ring 3 is seated in the annular part 4, 5 of a securing member made of rubber or the like, such part 4, 5 embracing the sealing ring 3 and the tubular shank 6 thereof being in engagement with the guide bushing 2. The radially outwardly extending mounting flange 7 of the securing member is in engagement with the cylinder head (not shown). Embedded in the shank 6 of the seal-securing member is a reinforcing sleeve 8 which has a flange 9 embedded in the flange 7 of the shank 6, such flange serving to facilitate the positioning of the securing member with the shank 6 drawn over the valve guide 2. The placement of the securing member in its assigned position is effected by slight hammer blows or the like exerted on the flange 7 which is reinforced by the flange 9 of the sleeve 8 and may be vulcanized in the shank 6. A radially inwardly projecting extension at the upper end of the tubular shank 6 establishes sealing engagement with the upper end of the guide bushing 2.

The structure shown in FIG. 1 accordingly proposes to embed in the tubular shank of the seal-securing member a metal sleeve provided with a flange 9 extending within the angular mounting or holding part 7, such flange and holding part being acted on by the assembly tool until the radially inwardly projecting lip or extension at the upper end of the shank 6 is in sealing engagement with the upper end of the guide bushing 2. This manner of mounting or assembling the structure is reliable and practical but not quite satisfactory, owing to the relatively great outer diameter of the mounting flange 7, particularly in cases, encountered in connection with internal combustion engines with two springs about each valve shaft, wherein the space between the valve shaft and the valve spring is very small. The inner valve spring has for this reason been omitted, in connection with diesel motors, despite the drawback incurred thereby. However, in other motors, operating with greater speed of revolution, this expedient cannot be applied.

In order to overcome this drawback, the invention proposes to surround the tubular shank of the seal-securing member partially or wholly by a reinforcing metal sleeve the end of which projects axially in the direction of the valve head beyond the shank, extending radially outwardly and being provided with slots or cutouts formed therein, such slotted extension forming the mounting flange of the securing member.

An example of an embodiment which incorporates the above noted feature is shown in FIGS. 2 and 3, FIG. 2 showing the slotted mounting flange of the sleeve in its initial position and FIG. 3 showing it in its final position. Parts corresponding to parts also shown in FIG. 1 are identically referenced.

In FIGS. 2 and 3, numeral 1 indicates the valve shaft which is surrounded by the guide bushing 2 and sealed by means of the ring 3 made of synthetic resin or the like. The sealing ring 3 is held against displacement by means of the annular securing member 4 having a tubular shank which is in sealing engagement with the guide bushing 2. A metal sleeve 8 embraces the tubular shank and is vulcanized thereto, its inner end extending radially inwardly and being embedded in the sleeve and its free outer end extending radially outwardly and forming the mounting flange 9. Cutouts or slots are provided in the mounting flange 9 thus subdividing the flange to form a plurality of ears or tongues.

The inner end 10 of the metal sleeve 8 extends radially inwardly and is embedded in the sleeve, thus forming a radially inwardly directed rubber bulge 11.

The sealing device is placed in position on the valve shaft 1 with the aid of an assembly or mounting tool in engagement with the slotted flange 9 (FIG. 1) and applying a force to such tool and therewith to the flange 9, which draws the device into position on the valve shaft 1, with the bulge 11 in sealing engagement with the inner end of the guide bushing 2, thereby fixing the seal-securing device in its proper position with the sealing ring 3 in sealing engagement with the valve shaft 1. Slight hammer blows applied to the mounting tool will bend the tongues of the flange 9 in axial direction as seen in FIG. 3.

The space which is gained by axially bending the tongues of the mounting flange is available for the positioning of a valve spring or springs.

Changes may be made within the scope and spirit of the appended claims which define what is believed to be new and desired to have protected by Letters Patent.

I claim:

1. A device for sealing the valve shaft of an internal combustion engine, wherein the valve shaft is guided within a guide bushing, said device comprising a sealing ring disposed in sealing engagement with the valve shaft, and securing means for holding said sealing ring in its sealing position, said securing means comprising an elastic annular member disposed in sealing engagement with said sealed ring, an elastic tubular shank integral with and extending axially from said annular member and surrounding said guide bushing, a metal sleeve coaxial with said tubular shank and extending along said tubular shank and having one end disposed in the region of the shank near said annular member and its other end disposed in a region beyond the end of the shank which is remote from said annular member, said sleeve having at least that end thereof nearest said annular member embedded in said tubular shank, said sleeve reinforcing said tubular shank and securing it in sealing engagement with said guide bushing, the said other end of said sleeve projecting beyond the end of said tubular shank comprising means thereon adapted for engagement by a tool for installing the device on said guide bushing, at least that part of said metal sleeve adjacent said other end thereof embracing said tubular shank throughout that portion thereof which is remote from said annular member, the said means on said other end of said sleeve comprises a flange directed radially outwardly from said sleeve, said flange having circumferentially distributed slots provided thereinto subdivide such flange into a plurality of tongues, said tongues being bendable for reduction of the diameter of said flange after installation of the device on said guide bushing.

2. A device for sealing the valve shaft of an internal combustion engine according to claim 1, wherein the said one end of said sleeve extends radially inwardly into said shank.

3. A device for sealing the valve shaft of an internal combustion engine according to claim 1 wherein the said one end of said sleeve extends radially inwardly into said shank, part of the material of said shank bulging radially inwardly along a line substantially coinciding with the embedded part of said sleeve to establish sealing engagement with the end of the guide bushing facing in the direction of said sealing ring.

References Cited

UNITED STATES PATENTS

| 1,248,129 | 11/1917 | Jones | 277—138 |
| 2,859,993 | 11/1958 | Estey | 277—212 |
| 2,906,255 | 9/1959 | Bunce | 123—188 |
| 3,174,813 | 3/1965 | Selz | 308—187.2 |
| 3,190,322 | 6/1965 | Brown | 277—178 |
| 3,243,240 | 3/1966 | Arthur | 277—178 |

FOREIGN PATENTS 561,898  4/1957  Italy.

SAMUEL ROTHBERG, *Primary Examiner.*